United States Patent [19]

Schoenthal et al.

[11] Patent Number: 4,598,060
[45] Date of Patent: Jul. 1, 1986

[54] PROCESS FOR THE PREPARATION OF WIDE PORE CATALYSTS

[75] Inventors: Galeon W. Schoenthal, Houston; Lynn H. Slaugh, Cypress, both of Tex.

[73] Assignee: Shell Oil Company, Houston, Tex.

[21] Appl. No.: 695,493

[22] Filed: Jan. 28, 1985

[51] Int. Cl.$^4$ .......................... B01J 21/04; B01J 21/08; B01J 21/12
[52] U.S. Cl. ...................................... 502/263; 502/182; 502/322; 502/332; 502/355
[58] Field of Search ............... 502/302, 303, 304, 322, 502/182, 263, 332, 355; 208/251 H

[56] References Cited

U.S. PATENT DOCUMENTS

| 4,356,113 | 10/1982 | Lim et al. | 502/68 |
| 4,440,631 | 4/1984 | Togari et al. | 502/302 X |
| 4,448,896 | 5/1984 | Kageyama et al. | 502/314 |

*Primary Examiner*—W. J. Shine

[57] ABSTRACT

This invention relates to alumina and/or silica supported catalysts which have a portion of their pores in the range of 75–1500 Å and wherein are or more catalytically active metal species is contained substantially within said pores. Carbon black particles having pores of 75–1500 Å and which have been reacted with the catalyst metal are used to prepare the catalyst using alumina and/or silica gels.

10 Claims, No Drawings

PROCESS FOR THE PREPARATION OF WIDE PORE CATALYSTS

FIELD OF THE INVENTION

This invention relates to catalysts having pore sizes in the range of 100–1000 angstroms and containing therein one or more catalytically active species of metals.

BACKGROUND OF THE INVENTION

In certain petrochemical reactions the use of catalysts containing metal impregnated pores having diameters less than about 100 angstroms can present many problems. Diffusional limitation can occur when reactions take place in very small pores. Plugging of fine pores can occur by deposition of polymers, tars or other coking material. Many petrochemical feedstocks contain various metal impurities such as nickel, vanadium or iron which can deposit out and poison small pore sized catalyst materials. U.S. Pat. No. 4,356,113 teaches a method for producing catalyst substrates containing pores within a certain calibrated range (100–1550 angstroms). Catalyst materials are made from these substrates by conventional impregnation techniques. However, these catalysts, in contrast to those of the instant invention, contain catalytically active metal species distributed throughout all of the pore sizes of the support.

SUMMARY OF THE INVENTION

The present invention relates to catalyst compositions which comprise porous alumina- and/or silica- containing supports having from about 5 to about 95 percent of their pore volume in pores having pore-sizes ranging from about 75 to 1500 angstroms wherein one or more catalytically active species of metals is contained substantially within the pore volume having pore sizes ranging from about 75 to about 1500 angstroms. The catalysts are prepared by (1) preparing an alumina- and/or silica-containing gel, (2) reacting a catalytically active metal species with carbon black particles having diameters ranging from about 75 to about 1500 angstroms, (3) intimately mixing said reacted carbon particles with said alumina- or silica-containing gel, drying the resultant product, calcining the resulting product and then heating in an oxygen-containing atmosphere in order to burn out the carbon black particles.

DESCRIPTION OF THE PREFERRED EMBODIMENTS

In preparing the catalyst of the instant invention, alumina- and/or silica-containing gels are slurried with carbon black particles which have been reacted with a catalytically reactive metal species, and the resultant product is dried, calcined and heated in air to burn out the carbon particles.

The alumina, alumina-silica and the silica gels utilized in the instant invention are prepared by well known processes. For example, alumina and silica gels are prepared commercially by acidifying soluble alkali metal aluminate or silicate solutions. Alumina gels can also be made by precipitating a suitable soluble aluminum salts such as aluminum nitrate or aluminum sulfate with a suitable precipitating agent such as ammonium hydroxide, sodium carbonate, etc. Mixtures of silica-alumina gels which are of considerable importance for the catalytic cracking of petroleum materials are often prepared by blending weakly acid or alkaline silica gel with a solution of aluminum sulfate, followed by appropriate exchange and washing cycles to lower the sodium content of the gel. Other techniques are well known to those skilled in the art and can be utilized as well. One key aspect in the process is that after preparation of the gels they should not be dehydrated to the extent that the structure is so changed that they cannot be reslurried in an appropriate solution. Reslurrying of the gels is necessary to uniformly disperse the reacted carbon black particles in the gel.

The carbon particles used to prepare the catalyst of the instant invention are those carbon particles termed carbon black. The term carbon black identifies an important family of industrial carbons used principally as reinforcing agents in rubber and as black pigments in inks, coatings and plastics. Carbon blacks are essentially elemental carbon. They are differentiated from bulk commercial carbons such as cokes and charcoals by the fact that carbon blacks are particulate, and are composed of more-or-less spherical particles, quasi-graphitic in structure, and are of colloidal dimensions. Many grades and types of carbon black are produced commercially. Particle sizes ranging from about 75 to about 1500 angstroms diameter are sold commercially. Carbon blacks come in various degrees of surface oxidation. The degree of surface oxidation can effect the reactivity of the carbon black with various materials. Surface oxidation can be removed by heating the carbon black particles to relatively high temperatures, for example, around the order to 3000° C.

In general, the particle diameters of the carbon blacks utilized in the instant invention will typically range from about 75 to about 1500 angstroms, preferably from about 100 to about 1000 angstroms, and more preferably from about 100 to 500 angstroms. Of course, it is understood that with regard to any particular carbon black, the particles therein are not all of the same diameter but comprise a spectrum of different particle diameters. Thus, when the term "particle diameter" is used herein with reference to the desired particle diameter utilized in the instant process, particle diameter thus means average particle diameter.

To prepare the instant catalyst, the carbon black particles are reacted with the appropriate catalytically active metal species.

The catalytically active materials used in the catalysts of the instant invention may be any of those materials from the Periodic Table which have evidenced catalytic activity. For example, these may be Group IA materials such as the alkali metals, Group IIA materials such as the alkaline earth metals, the transition metals, the actinide series metals, the lanthanide series metals, and metals and semi-metals from Groups IIIA, IVA, VA, and VIA such as for example, thallium, germanium, antimony, and selenium. A mixture of catalytically active materials may be present in the catalyst in the instant invention. For petrochemical reactions in general the transition metals are preferred. Typical catalyst metals would comprise molybdenum, cobalt, iron, titanium, nickel, and manganese. For demetalization of crude oil, vanadium, cobalt and molybdenum are particularly preferred. The platinum group metals provide particularly desirable catalyst species for hydrogenation reactions.

The catalytically reactive species is "reacted" in the form of a suitable salt, compound, or complex with the carbon black. This may be carried out by reaction in a suitable solution. By suitable solution is meant a solution (solvent) that will dissolve the appropriate catalytically active metal salt, compound, and/or complex. The solvent, for example, may be water or an organic solvent, depending on whether the salt, compound, or complex of the catalytic metal is inorganic in nature or is organometallic in nature. The solubility of salts, compounds and complexes of metals in various solvents have been tabulated in standard reference sources or can readily be determined by routine experimentation. Alternatively, the carbon black may be impregnated with the appropriate solution of the catalytically active metal salts(s), compound(s), and/or complex(es), the impregnated carbon black dried and then heat-treated to affix or react the catalytically active metal component to the carbon black.

The carbon black is contacted with the metal salt(s), compound(s) and/or complex(es) in solution and allowed to react therewith in situ or is subsequently dried and heat-treated to accomplish the reaction. The term "react" as used herein is utilized in the broadest sense; it can refer to chemical reaction, physical reaction, (such as, for example, adherence), physio-chemical reaction and the like. The reaction between the metal salt, compound or complex and the carbon black particles should be sufficiently complete that when the reacted carbon black is slurried into the gel, the metal on the carbon black particle does not dissolve in the slurrying solvent. For example, suitable metal ions in solution may react with oxygen-containing bonds in the carbon black and by this means attach themselves to the carbon black. Alternatively, the metal ions may be attracted to the carbon black via van der Waals forces or other attractive forces which cause the ions to be removed from solution and again attached to the carbon black particles. Another means comprises drying a suitable solution of metal salt, compound, or complex with the carbon black whereby the salt, compound or complex deposits on the carbon black, and then subsequently providing some method such as heat treatment to affix the metal salt, compound or complex to the carbon black. At times, decomposition of the original salt, compound or complex occurs during this heating. Another method comprises drying a suitable solution of metal salt, compound or complex with the carbon black whereby the salt, compound or complex deposits on the carbon black, and then to use as a slurring solvent, a solvent in which the dried salt, compound or complex is not soluble. This technique is particularly useful for the alkali metals (Group IA). Another method comprises slurrying the carbon black particles with a solution of metal salt(s), compound(s) or complex(es) and then adding to the slurry a precipitating agent whereby the metal salt, compound or complex is precipitated upon the carbon black particles. A preferred method is to contact the carbon black in solution with a suitable metallic salt, compound or complex, dry the resulting mixture to remove the solvent, and provide a mild heat treatment to decompose the salt, compound or complex to an insoluble form which will adhere to the carbon black particles. Any agglomerization of the carbon black is broken away by ball milling, air milling, or other attritive means.

Alternatively, the carbon black particle may be directly reacted with a catalytically active metal, such as, by vapor deposition of the metal or by subliming a sublimable metal salt on to the carbon black particles.

After individually preparing the alumina-containing or silica-containing gel and the carbon black combined with a catalytic metal species, the two different materials are slurried together in an appropriate slurrying solvent. The method for slurrying is typical of that used in process industries, such as example, high speed stirring or shearing. The degree of mixing of the gel and the carbon black should be sufficient to provide a uniform distribution of the carbon black in the gel. The solvent for the slurrying solution utilized should be one in which the metal as it is affixed to the carbon black is not soluble. If the metal were to dissolve in the slurrying solution, there would be provided a different distribution metals in the final catalyst than would be provided by the process of the instant invention.

After completing the above-described slurrying process, the product is dried to remove the slurrying solvent. After drying, the material is calcined to convert the gel to the oxide and then heated in an oxygen-containing atmosphere, preferably air, in order to burn out the carbon black particles. Calcination may be in a neutral, reducing or oxidizing environment. Drying, calcining and burn-out temperatures are not critical and appropriate temperatures can readily be determined by routine experimentation. Calcining temperatures will typically range from about 300° to about 700° C. Burn-out temperatures will depend on the concentration of oxygen in the burn-out atmosphere as well as the burn-out time involved. Typically burn-out temperatures will range from about 300° to about 700° C. Drying, calcining and burn-out may be combined in one or two steps. Most frequently the calcining and burn-out steps are combined using an oxygen-containing atmosphere such as, for example, air.

Certain other catalyst processing steps may be incorporated into the above described procedure without deviating from the scope and intent of this invention. For example, prior to the complete drying of the product, it may be formed into suitable pellets or rings and then dried more completely followed by calcination and burn-out. Alternatively, the dried product may be mulled; binders and lubricants added to the mulled product; and the resultant material extruded, dried, and calcined in air. Depending on the catalytically active species of metal present, the calcined product may be utilized as such as a catalyst, or it may, for example, be activated in a reducing atmosphere to reduce one or more of the catalytically active species of the metal to a lower oxidation state or to the metal per se. This activation step may be carried out in situ or by a separate reduction process.

The catalyst composition prepared as described herein will have a certain proportion of its pore volume, for example, from about 5 to about 95% in pores having the same pore-sizes that would correspond to the diameters of the carbon black particles utilized and which pores contain the catalytically active metal. Thus, a certain proportion of the pores of the catalyst would be found in the range from about 75 to about 1500, preferably from about 100 to about 1000, and more preferably from 100 to about 600 angstroms and would contain the catalytically active metal. The material will of course have those other pores that it would have had were it prepared without utilizing the carbon black material. Thus, the material may have pores about 600 angstroms and below 100 angstroms as well as pores in the 100–600 angstrom range but which contain no catalytically active metal. The use of the carbon black particles thus provides an additional proportion of pores in the above-described ranges over those pores that would have existed without the carbon black having been utilized in the preparation. The distribution of pores in the catalyst material may be substantially monomodal, i.e., primarily distributed about those ranges of pores diameters provided by the carbon black, or they may be polymodal i.e., with peak pore diameter distributions falling within the ranges provided by the carbon black as well as outside those ranges. Those pores which have been provided by the carbon black particles will be the pores that contain most of catalytically active metal species. Thus, the catalyst may contain pores provided by means other than that of the carbon black, but these pores will be significantly lacking in catalytic metal species. By the same token there may be pores in the same range as that provided by the carbon black, but which will be provided by other means, and thus which do not have catalytically active metal species found therein.

The catalysts of the instant invention are particularly useful in hydrocarbon or petrochemical reactions, particularly when catalytically active materials such as Group VIII metals are utilized as the catalytically active metal. The instant catalysts can be suitablely applied to hydrocarbon conversion processes such as catalytic cracking, hydrocracking, hydrotreating, reforming, isomerization, hydrogenation, dehydrogenation, oligomerization, alkylation, dealkylation, demetalization and the like.

Because the instant catalysts can be prepared with catalytically active pores of relatively large size, they are particularly useful for the conversion of hydrocarbon feedstocks and aromatic chemicals. The large pores of the instant catalysts allows for rapid diffusion in of reactants and rapid diffusion out of products, and provide for a much longer life than smaller pore materials which readily plug up with coke, tar or polymers.

The instant catalysts when utilizing molybdenum, vanadium and cobalt as the catalytically reactive metals, are very suitable for demetallization reactions involving crude feedstocks. The large pores of the instant catalysts are not quickly plugged up by the depositing metals, and hence provide for a long life. In a typical demetalization reaction a crude feedstock is contacted with the instant catalyst at a temperature ranging from about 350° to about 450° C. and a pressure ranging from about 500 to about 5000 psi.

Useful hydrocarbon conversion catalysts within the scope of the present invention will utilize catalytically reactive rare earth metals such as cerium, lanthanium, samarium, neodimium, and the like.

Catalysts of the instant invention and the process for preparing them will be further described below by the following illustrative embodiments which are provided for illustration and are not to be construed as limiting the invention.

EXAMPLE I

Preparation of Alumina-molybdenum Catalyst

A. Catalyst Preparation of Alumina Gel

Four hundred and forty grams of sodium aluminate were added to a stirred solution of 11 grams of sodium hydroxide in 1100 milliliters of water which was then heated to 70° C. in order to effect solution of the materials. A one mole solution of sulfuric acid was heated to 70° C., and both the aluminate solution and the acid solution were simultaneously pumped into a vigorously stirred beaker containing 750 milliliters of water maintained at 70° C. A pH of approximately 8 was maintained over the approximately 20 minutes that it took to combine the solutions. The resulting gel was then aged for about 15 minutes with the pH being adjusted to 10 by the addition of two molar sodium hydroxide solution.

Filteration and washing of the gel was carried out in a 19 centimeter diameter Buchner funnel. During the initial filtration, nearly all the supernatant water layer was drawn down to the level of the gel. In subsequent washing with dionized water, care was taken to avoid cracks in the gel by maintaining a water layer above the filter cake. Twelve liters of water were drawn through the filter cake over a four hour period.

B. Preparation of Carbon Black-molybdenum Oxide Particles

Twenty grams of ammonium heptamolybdate were dissolved in 20 milliliters of water. To this solution were added 20 grams of carbon black (Raven® 1255 carbon black, Columbia Chemicals Company, Tulsa, OK; Arthmetic Mean Particle Diameter, 230 angstroms; BET Surface Area, 125 m²/g). The resultant material was dried at 100° C. in a vacuum oven for about 5 hours and then heated to 190° C. in a vacuum oven for 16 hours. The dried solid was then ball milled and sieved to less than 200 mesh.

C. Catalyst Preparation

Two one-half of the alumina gel prepared in step A above was added 100 milliliters of water and 1 milliliters of acetic acid (peptizing agent), and the resultant was slurried using a high speed stirrer. To the above were added 5.9 grams of the carbon-molybdenum oxide particles prepared above while the slurrying was continued for 30 minutes. The material was then dried at 80° C. in an oven to a final weight of 298 g. The resulting material was extruded through a ⅜" die and the extrudate was dried at 120° C. in an oven for 3 hours. It was then placed in a Vycor® glass tube with a an air flow and heated to 400° C. in two hours and then to 500° C. over a 12 hour period and finally to 600° C. in one hour and then maintained at 600° C. for one hour. The catalyst was crushed and sieved to obtain 12–20 mesh material.

Analysis of the catalyst show that it contained approximately 1.7% by weight of molybdenum as the metal. The surface area (BET-nitrogen adsorption) was determined to be about 345 m²/G and the pore volume as measured by mercury intrusion at 3000 psi was determined to be about 1.11 cc/g. Pore distribution was determined by Hg intrusion to 55,000 psi. The percent pore volume distribution in the catalyst was found to be as follows:

| Range, A | Percent Pore Volume |
|---|---|
| <50 | 14.7 |
| 50–70 | 28.1 |
| 70–100 | 11.3 |
| 100–150 | 4.8 |
| 150–350 | 4.4 |
| >350 | 36.6 |

EXAMPLE II

Preparation of Cobalt Catalyst 21.0 Grams of cobalt nitrate in 20 milliliters of water was used to impregnate 10 grams of Raven ® 1255 Columbia Carbon Black. The impregnated material was heated at 270° C. under nitrogen for 8 hours, ball milled and sieved to less than 200 mesh.

An alumina gel was prepared as in Example IA above. To half of this alumina gel preparation was added 100 milliters of water and 2 milliters of acetic acid and the resulting material was slurried. The above prepared carbon-cobalt mixture was added to the gel and slurried. The resultant material was filtered after about 30 minutes and dried at 100° C. in an oven to final weight of about 270 grams. The solid was molded and extruded through a 5/64" die. The extrudate was dried at 120° C. in an oven for six hours, it was then placed in a Vycor ® glass tube with an air flow and heated to 400° C. in two hours, and then to 500° C. over a twelve hour period, and finally to 600° C. in one hour and then maintained at 600° C. for one hour. The catalyst was crushed and sieved to obtain 12-20 mesh material.

Analysis of the catalyst show that it contained approximately 1.3% by weight of cobalt as the metal. The surface area was determined to be about 248 $m^2/g$ and the pore volume was determined to be about 0.96 cc/g. The percent pore volume distribution was found to be as follows:

| Range, Å | Percent Pore Volume |
| --- | --- |
| <50 | 2.4 |
| 50–70 | 18.5 |
| 70–100 | 35.1 |
| 100–150 | 16.0 |
| 150–350 | 7.1 |
| >350 | 21.0 |

We claim:

1. A process of preparing a catalyst composition which comprises:
   (a) reacting carbon black with one or more catalytically active metal species,
   (b) initially slurrying the reacted carbon black particles with an alumina- and/or silica-containing gel,
   (c) drying the product of step (b),
   (d) calcining the product of step (c) at an elevated temperature sufficient to convert the gel to an oxide, and
   (e) burning out the carbon black in an oxygen-containing atmosphere.

2. The process of claim 1 wherein the carbon black particles have diameters ranging from about 75 to about 1500 Å.

3. The process of claim 2 wherein the diameters range from about 100 to about 1000 Å.

4. The process of claim 3 wherein the diameters range from about 100 to about 600 Å.

5. The process of claim 1 wherein step (a) comprises contacting the carbon black particles with a solution of one or more catalytically active metal salt(s), compound(s) and/or complex(es) dissolved in a solvent, drying the resultant metal-containing carbon black particles to remove the solvent and heating the carbon black particles to decompose the metal salt(s), compound(s) or complex(es).

6. The process of claim 1 wherein step (a) comprises contacting the carbon black particles with a solution of one or more catalytically active metal salt(s), compound(s) and/or complex(es) dissolved in a solvent and drying the resultant carbon black particles whereby dried metal salt(s), compound(s), and/or complex(es) deposit out on the carbon black particles.

7. The process of claim 1 wherein step (a) comprises contacting the carbon black particles with a solution of one or more catalytically active metal salt(s), compound(s) and/or complex(es) dissolved in a solvent, adding a precipitating agent to precipitate the metal salt(s), compound(s) and/or complex(es), and drying the resultant metal-containing carbon black particles to remove the solution solvent.

8. The process of claim 1 wherein step (b) comprises slurrying the carbon black with the gel in the presence of an aqueous slurrying medium.

9. The process of claims 1, 2, 3, 4, 5, 6, 7 or 8 wherein steps (c), (d) and (e) are combined in one step in an oxygen-containing atmosphere at a maximum temperature of ranging up to about 700° C.

10. The process of claims 1, 2, 3, 4, 5, 6, 7 or 8 wherein step (d) and (e) are combined in one step in an oxygen-containing atmosphere at a temperature ranging up to about 700° C.

* * * * *